(12) United States Patent
DiRisio et al.

(10) Patent No.: US 12,078,574 B2
(45) Date of Patent: Sep. 3, 2024

(54) SYSTEMS AND METHODS FOR VISUAL INSPECTION AND 3D MEASUREMENT

(71) Applicant: CORNING INCORPORATED, Corning, NY (US)

(72) Inventors: Carlo Richard DiRisio, Corning, NY (US); Markus Andreas Rothacker, Corning, NY (US); Xiaotian Zou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 219 days.

(21) Appl. No.: 17/882,771

(22) Filed: Aug. 8, 2022

(65) Prior Publication Data

US 2023/0052187 A1 Feb. 16, 2023

Related U.S. Application Data

(60) Provisional application No. 63/231,975, filed on Aug. 11, 2021.

(51) Int. Cl.
| | |
|---|---|
| *G01M 5/00* | (2006.01) |
| *C04B 38/00* | (2006.01) |
| *G06T 7/00* | (2017.01) |
| *G06T 7/30* | (2017.01) |

(52) U.S. Cl.
CPC ....... *G01M 5/0091* (2013.01); *C04B 38/0006* (2013.01); *G01M 5/0033* (2013.01); *G06T 7/001* (2013.01); *G06T 7/30* (2017.01)

(58) Field of Classification Search
None
See application file for complete search history.

(56) References Cited

U.S. PATENT DOCUMENTS

| | | | |
|---|---|---|---|
| 8,090,143 B2 | 1/2012 | Komaki et al. | |
| 8,537,215 B2 | 9/2013 | Booth et al. | |
| 11,761,899 B2 * | 9/2023 | Terahai | G06T 7/0008 382/141 |
| 11,915,409 B2 * | 2/2024 | Terahai | B25J 15/0004 |
| 11,946,876 B2 * | 4/2024 | Barnes | G01N 21/95692 |
| 2011/0116704 A1 | 5/2011 | Zoeller, III | |
| 2014/0117588 A1 * | 5/2014 | Schindler, II | B41M 3/00 264/405 |

(Continued)

FOREIGN PATENT DOCUMENTS

| | | | | |
|---|---|---|---|---|
| CN | 108439987 A | * | 8/2018 | B33Y 10/00 |
| WO | 2021/040986 A1 | | 3/2021 | |

*Primary Examiner* — Ricky Chin
(74) *Attorney, Agent, or Firm* — Kevin M. Able

(57) ABSTRACT

Systems and methods for inspecting the outer skin of a honeycomb body are provided. The inspection system comprises a rotational sub-assembly configured to rotate the honeycomb body, a camera sub-assembly configured to image at least a portion of the outer skin of the honeycomb body as it rotates, a three-dimensional (3D) line sensor sub-assembly configured to obtain height information from the outer skin of the honeycomb body; and an edge sensor sub-assembly configured to obtain edge data from the circumferential edges of the honeycomb body. In some examples, the inspection system utilizes a universal coordinate system to synchronize or align the data obtain from each of these sources to prevent redundant or duplicative detection of one or more defects on the outer skin of the honeycomb body.

20 Claims, 16 Drawing Sheets

(56) References Cited

U.S. PATENT DOCUMENTS

| | | | |
|---|---|---|---|
| 2014/0308483 A1* | 10/2014 | Li | A61F 13/536 428/167 |
| 2015/0037542 A1* | 2/2015 | Nadella | B32B 3/28 428/182 |
| 2021/0285894 A1* | 9/2021 | Madara | G01N 21/95692 |
| 2021/0405086 A1* | 12/2021 | te Velthuis | G01N 21/21 |
| 2022/0048250 A1* | 2/2022 | Knecht | B29C 64/282 |
| 2022/0214289 A1* | 7/2022 | Daugherty | G01N 21/95692 |
| 2022/0299449 A1* | 9/2022 | Barnes | G01N 21/95692 |

* cited by examiner

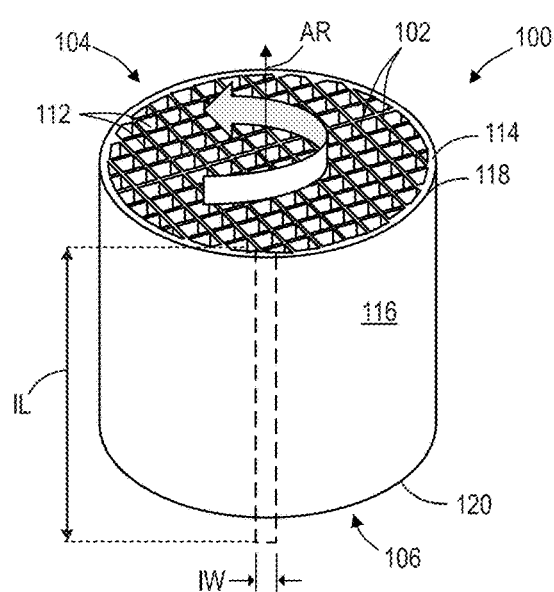
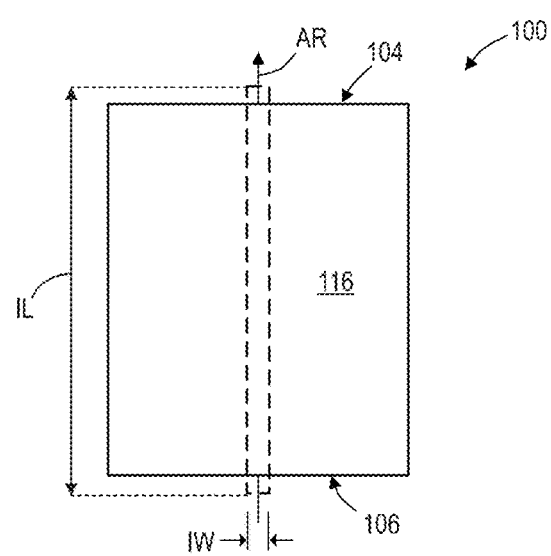
Fig. 1A
Fig. 1B

SYSTEMS AND METHODS FOR VISUAL INSPECTION AND 3D MEASUREMENT

CROSS-REFERENCE TO RELATED APPLICATION

This application claims the benefit of priority under 35 U.S.C. § 119 of U.S. Provisional Application Ser. No. 63/231,975 filed on Aug. 11, 2021, the content of which is relied upon and incorporated herein by reference in its entirety.

FIELD OF THE DISCLOSURE

The present disclosure is directed generally to inspection systems, specifically to inspection systems for honeycomb bodies, and more specifically to inspection systems for inspecting the outer skin of honeycomb bodies for anomalies or defects.

BACKGROUND

Honeycomb bodies are used in a variety of applications, such as the construction of particulate filters and catalytic converters that treat unwanted components in a working fluid, such as pollutants in a combustion exhaust. The manufacture of honeycomb bodies can include inspection for the presence of surface defects that might be present and that could adversely impact performance of the honeycomb body.

SUMMARY OF THE DISCLOSURE

The present disclosure provides systems and methods for inspecting the outer skin of a honeycomb body. The inspection system comprises a rotational sub-assembly configured to rotate the honeycomb body, a camera sub-assembly configured to image at least a portion of the outer skin of the honeycomb body as it rotates, a three-dimensional (3D) line sensor sub-assembly configured to obtain height information from the outer skin of the honeycomb body; and an edge sensor sub-assembly configured to obtain edge data from the circumferential edges of the honeycomb body. In some examples, the inspection system utilizes a universal coordinate system to synchronize or align the data obtain from each of these sources to prevent redundant or duplicative detection of one or more defects on the outer skin of the honeycomb body.

In one example, a system for visual inspection and three-dimensional (3D) measurement of a honeycomb body is provided, the system comprising an at least one roller supporting the honeycomb body, the actuator configured to rotate the honeycomb body continuously over at least a portion of a full rotation of the honeycomb body about an axis of rotation; at least one camera having a first field of view encompassing an inspection region of an outer circumferential surface of the honeycomb body; a travel sensor that measures circumferential travel along the outer circumferential surface of the honeycomb body when the honeycomb body is rotated by the at least one roller; and a first edge sensor configured to inspect a first circumferential edge of the honeycomb body; or at least one 3D line sensor configured to inspect and obtain height data associated with the outer circumferential surface of the honeycomb body; wherein the travel sensor is configured to trigger inspection by the at least one camera and at least one of the first edge sensor or the at least one 3D line sensor at a predetermined increment of circumferential travel.

In an aspect, the first edge sensor has a second field of view that encompasses at least a portion of a first end of the honeycomb body and the first circumferential edge of the honeycomb body In an aspect, the system comprises a second edge sensor with a third field of view that encompasses at least a portion of a second end of the honeycomb body and a second circumferential edge of the honeycomb body.

In an aspect, the second edge sensor is configured to translate along a first translational axis, wherein the first translational axis is substantially parallel with the axis of rotation.

In an aspect, the at least one 3D line sensor is secured to a line sensor actuator, the line sensor actuator configured to translate the at least one 3D line sensor within a plane substantially parallel with the axis of rotation and along a second translational axis, wherein the second translational axis is substantially orthogonal to the axis of rotation.

In an aspect, a first optical axis associated with the first field of view of the at least one camera, is arranged substantially orthogonal to a second optical axis associated with the at least one 3D line sensor.

In an aspect, the at least one camera comprises a plurality of cameras arranged substantially parallel with the axis of rotation.

In an aspect, the at least one 3D line sensor comprises a plurality of 3D line sensors arranged substantially parallel with the axis of rotation.

In as aspect, data obtained by the at least one camera is compared to data obtained by either (i) the first edge sensor; or (ii) the at least one 3D line sensor.

In an aspect, when the system comprises the first edge sensor, the comparison of data comprises synchronizing or aligning at least one composite image obtained by the at least one camera with the data obtained by the first edge sensor; or wherein, when the system comprises at least one 3D line sensor, the comparison of data comprises synchronizing or aligning the at least one composite image obtained by the at least one camera with the data obtained by the at least one 3D line sensor.

In another example, a method for visually inspecting and measuring a honeycomb body, the method comprising: rotating, via at least one roller, the honeycomb body, continuously over at least a portion of a full rotation of the honeycomb body about an axis of rotation; inspecting, via a first field of view of at least one camera, an inspection region of an outer circumferential surface of the honeycomb body; measuring, via a travel sensor, a travel along the outer circumferential surface of the honeycomb body when the honeycomb body is rotated by the at least one roller; and triggering, via the travel sensor, an inspection of a first circumferential edge of the honeycomb body via a first edge senor, or a gathering of height data associated with the outer circumferential surface of the honeycomb body via at least one 3D line sensor; wherein the triggering occurs at a predetermined increment of circumferential travel.

In an aspect, the inspection of the first circumferential edge of the honeycomb body via the first edge sensor comprises inspecting, in a second field of view, at least a portion of a first end of the honeycomb body and the first circumferential edge.

In an aspect, the method further comprises: inspecting, via a second edge sensor with a third field of view, at least a portion of a second end of the honeycomb body and a second circumferential edge of the honeycomb body.

In an aspect, the method further comprises: translating the second edge sensor along a first translational axis, wherein the first translational axis is substantially parallel with the axis of rotation.

In an aspect, the method further comprises: translating the at least one 3D line sensor within a plane substantially parallel with the axis of rotation and along a second translational axis, via a line sensor actuator, wherein the second translational axis is substantially orthogonal to the axis of rotation.

In an aspect, a first optical axis associated with the first field of view of the at least one camera, is arranged substantially orthogonal to a second optical axis associated with the at least one 3D line sensor.

In an aspect, the method further comprises: imaging with the at least one camera at least a portion of the outer circumferential surface of the honeycomb body, wherein the at least one camera comprises a plurality of cameras arranged substantially parallel with the axis of rotation.

In an aspect, the method further comprises: obtaining the height data via the at least one 3D line sensor, wherein the at least one 3D line sensor comprises a plurality of 3D line sensors arranged substantially parallel with the axis of rotation.

In an aspect, the method further comprises: comparing data obtained by the at least one camera with data obtained by either (i) the first edge sensor; or (ii) the at least one 3D line sensor.

In an aspect, the step of comparing data when the method comprises obtaining data from the first edge sensor, comprises synchronizing or aligning at least one composite image obtained by the at least one camera with the data obtained by the first edge sensor; or when the method comprises obtaining data from the at least one 3D line sensor, the comparison of data comprises synchronizing or aligning the at least one composite image obtained by the at least one camera with the data obtained by the at least one 3D line sensor.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 1A is a perspective view of a honeycomb body according to the present disclosure.

FIG. 1B is a side elevational view of a honeycomb body according to the present disclosure.

DETAILED DESCRIPTION

Figure 2A:
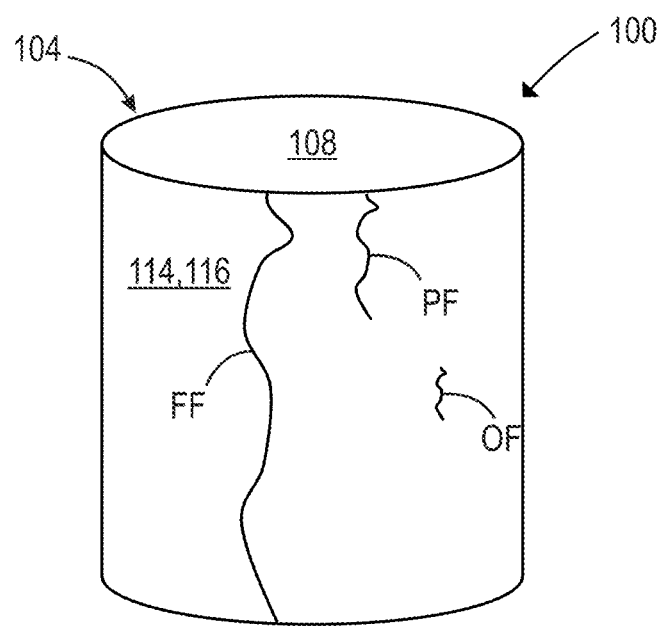
FIG. 2A is a side perspective view of a honeycomb body with defects according to the present disclosure.

The present disclosure provides systems and methods for inspecting the outer skin of a honeycomb body. The inspection system comprises a rotational sub-assembly configured to rotate the honeycomb body, a camera sub-assembly configured to image at least a portion of the outer skin of the honeycomb body as it rotates, a three-dimensional (3D) line sensor sub-assembly configured to obtain height information from the outer skin of the honeycomb body; and an edge sensor sub-assembly configured to obtain edge data from the circumferential edges of the honeycomb body. In some examples, the inspection system utilizes a universal coordinate system to synchronize or align the data obtain from each of these sources to prevent redundant or duplicative detection of one or more defects on the outer skin of the honeycomb body.

The following description should be read in view of FIGS. 1A-1B. FIGS. 1A and 1B illustrate an exemplary honeycomb body 100 according to the present disclosure. Honeycomb body 100 is generally formed from a ceramic material in the green or fired state. Honeycomb body 100 comprises a plurality of intersecting inner walls 102 extending longitudinally through the honeycomb body 100, substantially parallel to an axis of rotation AR (discussed below) and from a first end 104 to a second end 106 of honeycomb body 100. Once formed, e.g., extruded, honeycomb body 100 comprises a first end face 108 (shown in FIG. 2A) proximate first end 104 and a second end face 110 proximate second end 106 (shown in FIG. 4). The inner walls 102 combine to define a plurality of channels, or cells 112, that form bores, or lumens, extending through the honeycomb body 100 from the first end face 108 to the second end face 110 and form the cellular honeycomb construction of the honeycomb body 100. It should be appreciated that, in some examples, honeycomb body 100 is constructed from porous ceramic materials.

An outer skin 114 surrounds the inner walls 102 and defines an outer circumferential surface 116 of the honeycomb body 100. The outer surface 116 refers to the circumferential surface that extends longitudinally between first end 104 and second end 106 of honeycomb body 100. For ease of discussion herein, the term circumferential (and/or circumference) is used, however it should be appreciated that, in some examples, the honeycomb body 100 is formed in shapes other than cylindrical, and that the circumferential surface 116 is intended to refer to the outer peripheral surface of any such shape. The outer skin 114 forms and defines the outer shape of honeycomb body 100.

Proximate first end 104, honeycomb body 100 comprises a first circumferential edge 118. First circumferential edge 118 defines the edge formed by the transition between first end face 108 and outer circumferential surface 116 of honeycomb body 100. Similarly, and proximate second end 106, honeycomb body 100 comprises a second circumferential edge 120. Second circumferential edge 120 defines the edge formed by the transition between second end face 110 and outer circumferential surface 116. Again, the term circumferential is used to define the outer peripheral surface of any shape that honeycomb body 100 takes.

As illustrated in FIGS. 4-10, the systems, apparatuses, and/or methods disclosed herein are intended to detect whether any anomalies are present in and/or on the outer skin 114 of a honeycomb body 100. If an anomaly is detected, some of these anomalies can be merely aesthetic while others can be defects that cause honeycomb body 100 to fail inspection, e.g., necessitate the repair or rejection of honeycomb body 100. The examples described herein are capable of determining when an anomaly constitutes such a defect. Examples of aesthetic anomalies include but are not limited to side stick, loose fibers, tube gauge marks, and corrugation. Examples of defects (which may require repair or rejection) include but are not limited to macro/micro full fissures, macro/micro partial fissures, oil fissures, raised fissures, air checks, and edge chips.

Figure 2B:
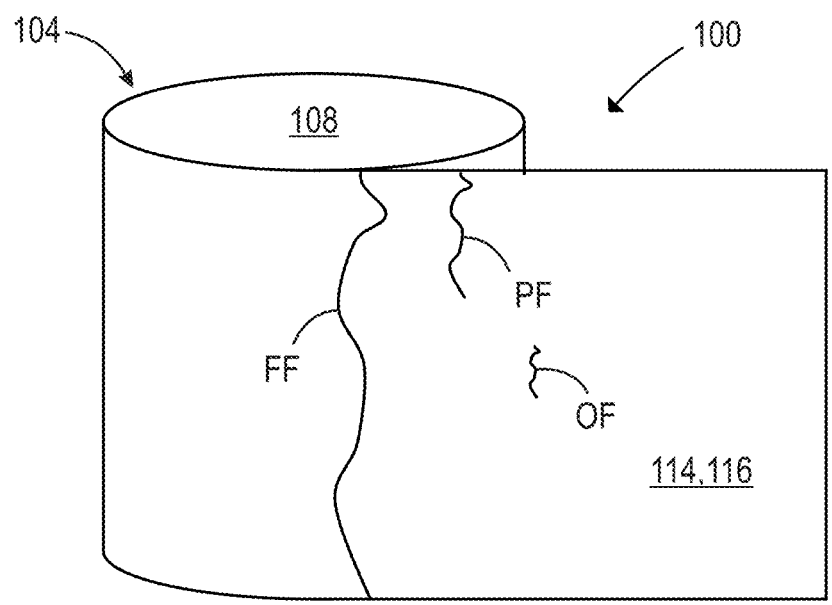
FIG. 2B is a side perspective view of a honeycomb body with defects according to the present disclosure.
Figure 3A:
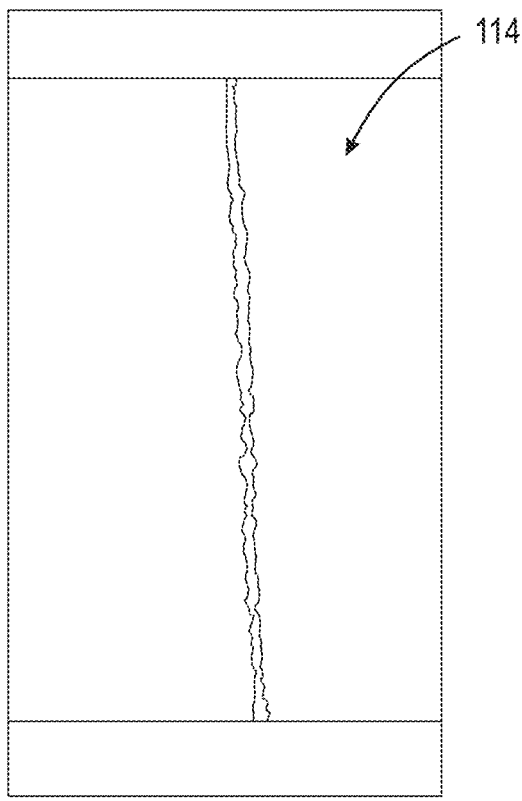
FIG. 3A is a side view of the outer skin of a honeycomb body with defects according to the present disclosure.
Figure 3B:
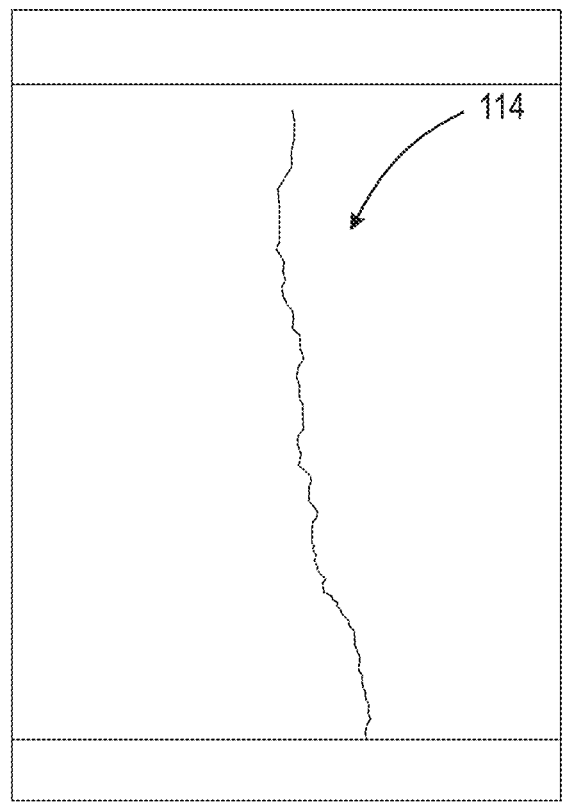
FIG. 3B is a side view of the outer skin of a honeycomb body with defects according to the present disclosure.
Figure 3C:
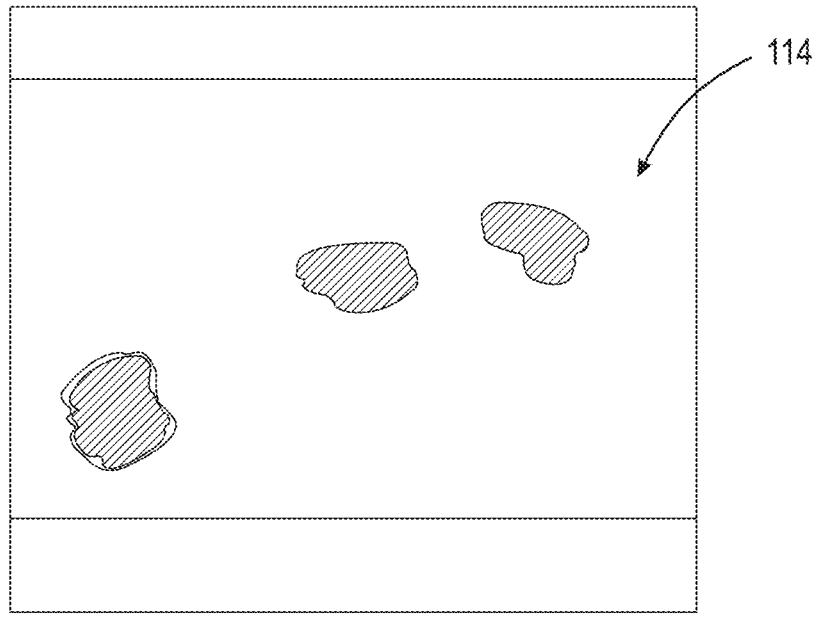
FIG. 3C is a side view of the outer skin of a honeycomb body with defects according to the present disclosure.

Referring now to FIGS. 2A-2B, a honeycomb body 100 having multiple defects will be described. As described above, honeycomb bodies can have a wide variety of surface defects including full fissures, partial fissures, oil fissures, and air checks. All but full fissures and some debris lines extend along only a portion of the length of the honeycomb body 100. For example, honeycomb body 100 is illustrated having a full fissure FF, a partial fissure PF, and an oil fissure OF. Additionally, as shown in FIGS. 3A-3C defects can present themselves as debris lines (FIG. 3A) or other defects that include protruding sections of skin 114 or lower damaged sections of skin, cracks (FIG. 3B), and/or pits that expose the inner matrix/honeycomb structure (FIG. 3C). In the examples described below of an inspection apparatus 200, the apparatus is intended to inspect a honeycomb body 100 and obtain data, e.g., images or other data, of portions of the outer skin 114, portions of the first or second circumferential edges (118,120), and/or height data from the surface of outer skin 114 of honeycomb body 100.

Figure 4:
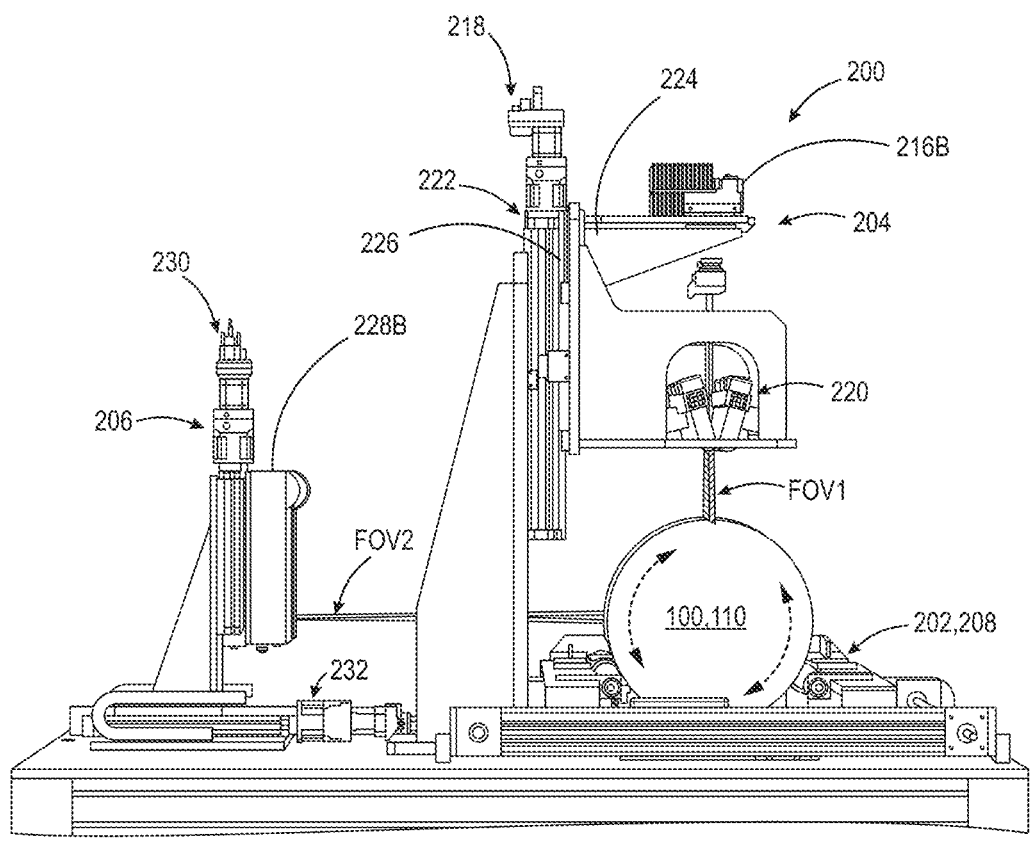
FIG. 4 is a side perspective view of an inspection system according to the present disclosure.
Figure 5A:
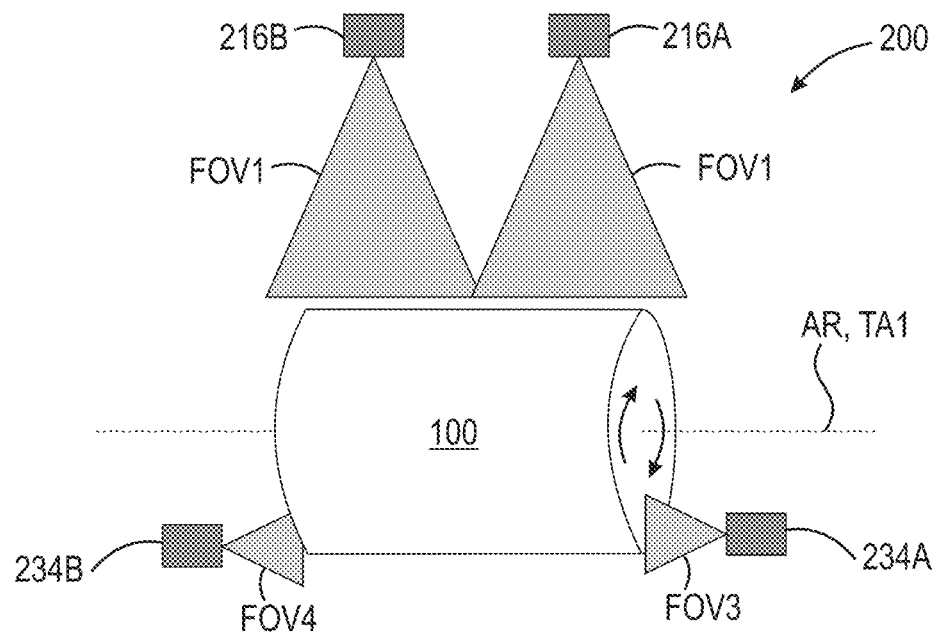
FIG. 5A is a schematic view of an inspection system according to the present disclosure.
Figure 5B:
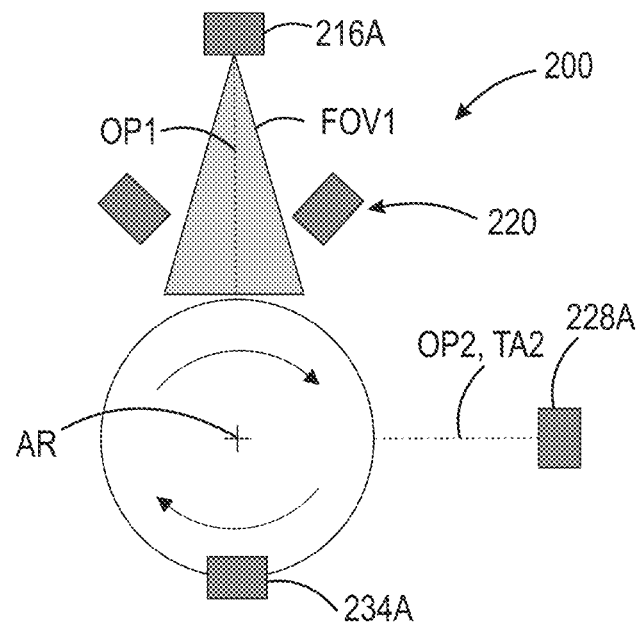
FIG. 5B is a side schematic view of an inspection system according to the present disclosure.

Referring now to FIGS. 4-5B, the present disclosure provides an example inspection system 200 for inspecting a honeycomb body 100. FIG. 4 illustrates a side elevational view of inspection system 200. FIGS. 5A and 5B illustrate schematic representations of a front view and side view of the inspection system 200, respectively. In some examples, such an inspection system 200 is configured to provide a composite camera image 236 (discussed below) of at least a portion of skin 114, a height map (discussed below) of at least a portion of skin 114, and/or one or more composite images of at least a portion of the first or second circumferential edges of the honeycomb body 100, e.g., first circumferential edge 118 or second circumferential edge 120. In some examples, the inspection system 200 is configured to capture at least a series of images corresponding to first inspection region 122 that extends over the entire length of the honeycomb body 100 and a predefined portion of the outer circumferential surface 116 of the honeycomb body 100. The images of the first inspection region 122 are combined to form a composite camera image 236 (shown in FIG. 11) showing the entire outer circumferential surface 116. Additionally, the inspection apparatus 200 is also configured to capture height data 238 (discussed below) from the outer circumferential surface 116 which extends over the entire length of the honeycomb body 100. Furthermore, inspection system 200 is configured to capture edge data (discussed below) of at least one of the first circumferential edge 118 or the second circumferential edge 120.

To those ends, system 200 comprises a rotational sub-assembly 202, a camera sub-assembly 204, a three-dimensional (3D) line sensor sub-assembly 206, and an edge sensor sub-assembly 208. Rotational sub-assembly 202 (shown in FIGS. 4 and 6A) is configured to rotate the honeycomb body 100 during inspection. Rotational sub-assembly 202 comprises motor 210 and a plurality of rollers 212. Plurality of rollers 212 comprises a drive roller 212A and an additional roller 212B (collectively referred to as "plurality of rollers 212" or "rollers 212"). Motor 210 is configured to generate a rotation of drive roller 212A that in-turn forces honeycomb body 100 to rotate about axis of rotation AR (hereinafter referred to as "axis of rotation AR", "rotational axis AR", or "axis AR"), e.g., to rotate honeycomb body 100 over at least one complete rotation about axis AR. In some examples, motor 210 is coupled to the drive roller 212A via a gearbox GB. The gearbox GB can be coupled to a drive mechanism, such as a belt or chain drive. As alternatives, motor 210 or the gearbox GB can be directly coupled to drive roller 212A. In some examples, motor 210 is a servo motor, but it should be appreciated that other motors can be used, such as an electric motor or a pneumatic motor. In embodiments, the rotational speed of the motor 210 is set so that the outer circumferential surface 116 of the honeycomb body 100 travels at a speed of at least 125 mm/s, in an example at least 150 mm/s, and in an another example at least 250 mm/s.

The drive roller 212A is configured to contact the outer circumferential surface 116 of honeycomb body 100 and, in some examples, is at least partially constructed of a material that creates friction between the drive roller 212A and the outer circumferential surface 116 of honeycomb body 100. In this way, rotation of the drive roller 212A results in rotation of the honeycomb body 100 when the surface 116 of the honeycomb body 100 is engaged against the drive roller 212A. In some examples, drive roller 212A comprises a relatively soft material to cushion the honeycomb body 100, e.g., polyurethane.

Figure 6A:
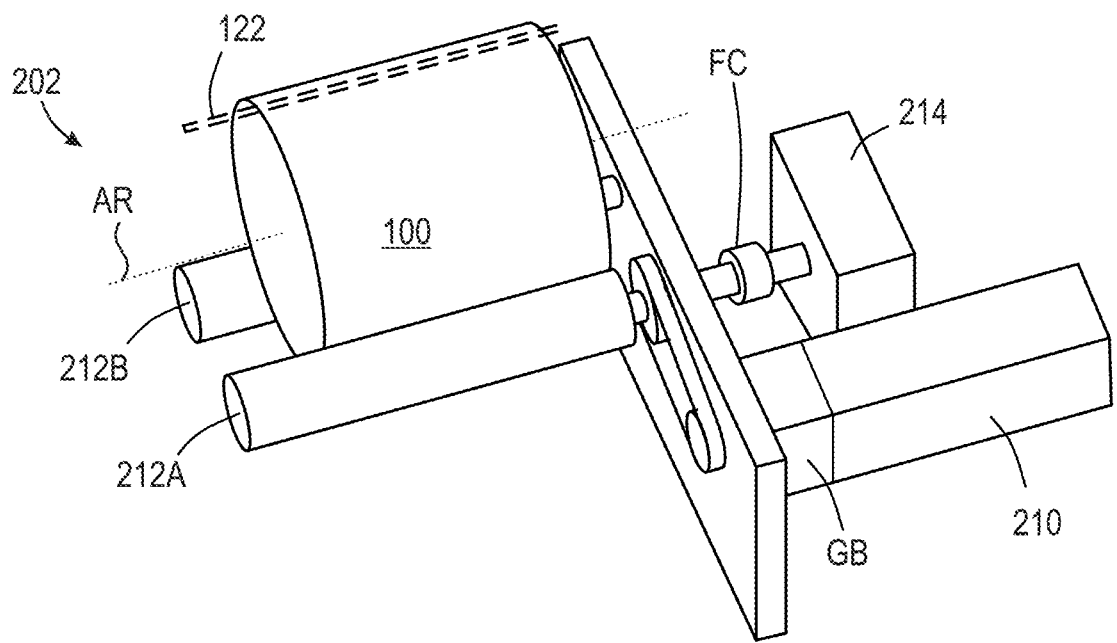
FIG. 6A is a rotational sub-assembly according to the present disclosure.

The additional roller 212B is intended to be freely rotatable and combines with drive roller 212A to form a support for the honeycomb body 100 as shown in FIG. 6A. The honeycomb body 100 can be supported in a horizontal orientation, though it should be appreciated that, in some examples, the honeycomb body 100 is supported in any suitable orientation. The additional roller 212B is configured to rotate with the rotation of the honeycomb body 100, which is forced to rotate by drive roller 212A. In the example illustrated in at least FIGS. 4 and 6A, drive roller 212A and additional roller 212B are disposed on a side of the honeycomb body 100 that is opposite the first inspection region 122 so that the rollers 212 are spaced from a perimeter of the first inspection region 122. That spacing ensures that the rollers 212 do not interfere with the fields of view of the cameras 216 (discussed below), the illumination provided by the light source assembly 220 (discussed below), the fields of view of the 3D line sensors 228 (discussed below), and the fields of view of the edge sensors 234 (discussed below). It should be appreciated that honeycomb body 100 can be loaded onto the rollers 212 manually or automatically. For example, an operator can manually load the honeycomb body 100 onto rollers 212. In another example, system 200 comprises a loading mechanism, such as a robot, that is configured to place the honeycomb body 100 onto rollers 212.

Rotational sub-assembly 202 also comprises at least one travel sensor 214 (shown in FIG. 6A) configured to measure circumferential travel of the honeycomb body 100 as it is rotated by the drive roller 212A. As will be discussed below, travel sensor 214 is employed to trigger one or more component devices of system 100, for example, travel sensor 214 is configured to activate or otherwise instruct first camera 216A (discussed below), first 3D line sensor 228A (discussed below), and/or first edge sensor 234A (discussed below) to collect data, e.g., images or other visual data, of the visible portions of honeycomb body 100 as it is rotated. Advantageously, as will be discussed below, by triggering the data collection of each of these component devices using the same signal, the collected data can be compared within a universal coordinate system shared among all devices which prevents defects or aesthetic anomalies from being double counted or misinterpreted by system 200. Moreover, as travel sensor 214 is configured to trigger these component devices based on circumferential travel of honeycomb body 100, variations in rotational speed of the honeycomb body 100 advantageously do not affect the rate at which data is collected or the timing related to triggering the component devices. In one example, travel sensor 214 is an encoder that is coupled to drive roller 212A, but the travel sensor 214 is not limited to an encoder and can comprise contact or non-contact travel measuring devices. In some examples, travel sensor 214 is coupled to the drive roller 212A using a flexible rotating coupling FC so that the roller 212A and/or travel sensor 214 do not bind or damage each other during rotation. In an example, travel sensor 214 is an encoder having a measurement resolution of less than 0.5 µm. In other examples the encoder has a measurement resolution of less than 0.2 µm or less than 0.1 µm.

As set forth above, inspection system 200 also comprises a camera sub-assembly 204. Camera sub-assembly 204 comprises at least one camera 216A, a camera actuator 218, and a light source assembly 220. In some examples, as illustrated in FIGS. 4-5B and 6B, camera sub-assembly 204 comprises a plurality of cameras, i.e., a first camera 216A and a second camera 216B (collectively referred to herein as "plurality of cameras 216" or "cameras 216"). Although the following description refers to a single camera, i.e., camera 216A, it should be appreciated that each camera of the plurality of cameras 216 are substantially identical and serve similar and equivalent functions.

Figure 6B:
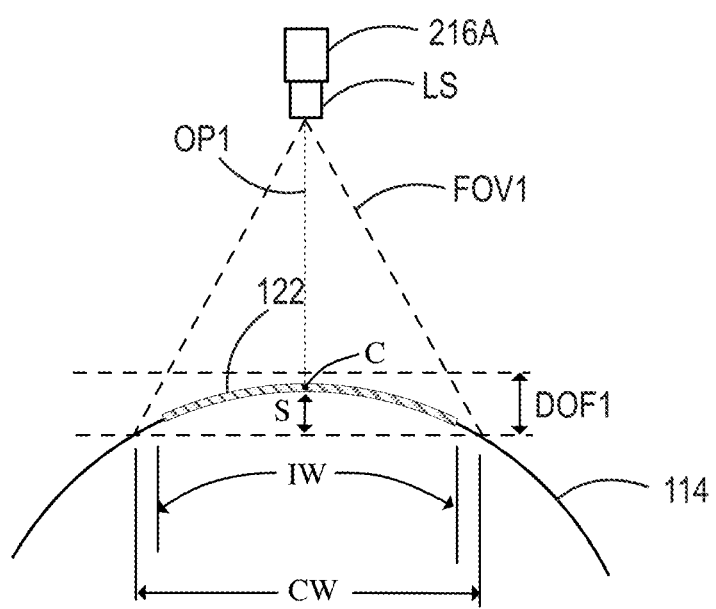
FIG. 6B is a schematic view of a camera sub-assembly according to the present disclosure.

As schematically illustrated in FIG. 6B, camera 216A is arranged relative to the honeycomb body 100 so that camera 216A defines a field of view FOV1 and depth of field DOF1 that encompass the first inspection region 122 of the outer circumferential surface 116 of skin 114 of the honeycomb body 100. For example, the field of view FOV1 can be sized to have a length dimension that is greater than or equal to a length dimension IL (shown in FIGS. 1A and 1B) of the first inspection region 122 in a direction parallel to the axis of rotation AR of the honeycomb body 100 so that the camera 216A is configured to image the entire length of the honeycomb body 100. In embodiments, the field of view length dimension is at least about 3%, about 5%, or even about 10% longer than the length dimension IL of first inspection region 122 and/or of the full length of the honeycomb body 100 between the first end 104 and second end 106. Additionally, the field of view FOV1 is sized to have a width dimension CW (shown in FIG. 6B) that encompasses a width dimension IW (also shown in FIGS. 1A-1B and 6B) that is an arc length of the first inspection region 122, so that the camera 216A is configured to image a predefined length of the circumference of the honeycomb body 100. In embodiments, the width dimension IW of the first inspection region 122 is in a range of 2-20 µm, in a further example in a range of 5-15 µm, and in a further example about 10 µm.

Additionally, the camera 216A is selected so that the depth of field DOF1 allows the entire portion of the outer circumferential surface 116 encompassed by the first inspection region 122 to be in focus. For example, the outer circumferential surface 116 is curved generally about axis AR of the honeycomb body 100. As a result, portions of the outer circumferential surface 116 within the first inspection region 122 are at different distances from the camera 216A, when measured parallel to an optical axis OP1 (shown in FIG. 6B) of the camera 216A. The difference between the minimum distance to the camera and the maximum distance to the camera of the outer circumferential surface 116 in the first inspection region 122 defines a segment depth S, shown in FIG. 6B, and the depth of field DOF1 of the camera 216A is greater than or equal to the segment depth S. In an example, the inspection apparatus 200 is configured to inspect a honeycomb body 100 having a diameter of about 6.0" by providing a camera 216A configured to image a first inspection region 122 having a length dimension IL of about 6.2", and a width dimension IW of about 10 µm, within a depth of field of 10 mm (i.e., +/−5 mm from the outer circumferential surface 116).

In one example, shown in FIG. 6B, camera 216A is coupled to a lens LS to provide magnification and/or to alter the field of view FOV1 of camera 216A. In an example, the lens LS is a telecentric lens. In an example, the lens LS is a macro lens. In an example, the lens LS provides magnification in a range of ×0.05-×2.0. In an example, the lens provides ×0.35 magnification.

Still further, the camera 216A is selected to provide a data transfer rate that supports an inspection cycle time that is significantly less than 60 seconds. In an example, the data transfer rate is fast enough to capture images of the entire outer circumferential surface 116 of the honeycomb body 100 and transfer the captured images to storage in less than 20 seconds. In an example, the cycle time is less than about 5 seconds, less than about 2 seconds, or more preferably less than about 1.5 seconds. In an example, camera 216A is a line scan camera. In one example, camera 216A is constructed from a linear array of 10 k-20 k pixels having 0.5 µm-7.5 µm resolution, and in an example a linear array of 16 k pixels having 3.5 µm pixel resolution.

In some examples, cameras 216 are color cameras configured to capture color photographs of portions or segments of outer skin 114. Some defects, e.g., the pitting defects illustrated in FIG. 3C, can expose the internal honeycomb matrix of honeycomb body 100. In some examples the color of skin 114 is substantially different from the color of the side walls 102 that form the honeycomb matrix. As such, defects which expose the internal matrix are easily seen or detected by color cameras as the color difference between the skin and the internal matrix is clear.

In some examples, as illustrated in FIG. 5A, camera sub-assembly 204 comprises more than one camera arranged in a line. For example, first camera 216A and second camera 216B are arranged next two each other, along an axis that is substantially parallel with the axis of rotation AR. By utilizing more than one camera arranged along a line parallel with the axis of rotation AR of honeycomb body 100, inspection system 200 can ensure that the field of view of at least one of the cameras, or the collective field of view of all of the cameras will encompass the entire length dimension of the honeycomb body 100.

Figure 7:
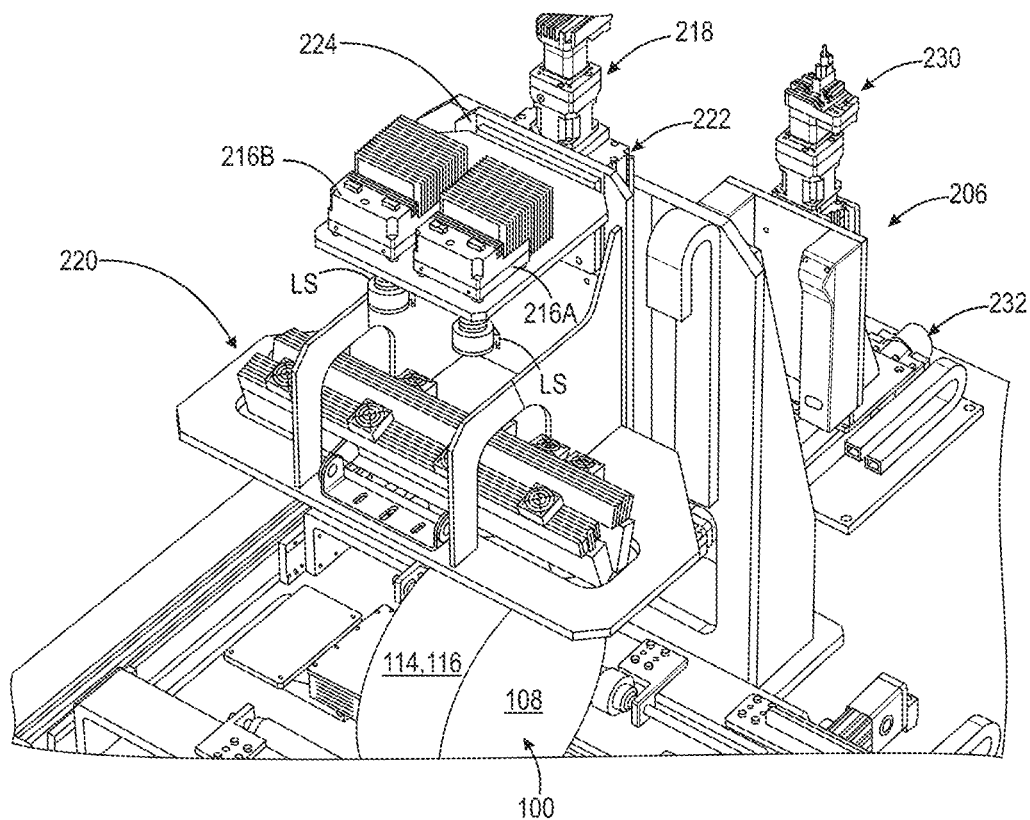
FIG. 7 is a top perspective view of a camera sub-assembly according to the present disclosure.

As illustrated in FIGS. 4 and 7, inspection apparatus 200 also comprises an actuator, i.e., a camera actuator 218, connected to a movable fixture 222 to provide relative movement between the camera 216A and the honeycomb body 100 in the direction parallel to the optical axis OP1 of camera 216A. For example, the movable fixture 222 can be a translation slide mechanism that comprises a camera mount 224 (shown in FIG. 4) and at least one slide rail 226 (also shown in FIG. 4). The camera mount 224 is movably coupled to the slide rail 226 so that the camera mount 224 can be translated. The slide rail 226 is fixed relative to the honeycomb body 100. In some examples, camera 216A is fixedly coupled to the camera mount 224 in an orientation that allows the camera 216A to be translated relative to the slide rail 226 and the honeycomb body 100 in a direction parallel to the optical axis OP1 of the camera 216A. In an example, the slide rail 226 is oriented vertically so that the camera 216A is translatable in a vertical axis toward and away from the honeycomb body 100. In some examples, camera actuator 218 is a linear servo intended to actuate or translate the movable fixture 222 in a plane orthogonal to the axis of rotation AR and substantially parallel with optical axis OP1 of camera 216A. In an example, the camera 216A is positioned so that a center of the depth of field DOF1 is located approximately on a nominal diameter of the honeycomb body 100 being inspected, for example so that the depth of field DOF1 defines a focused region that extends 5 mm outward and 5 mm inward from the nominal outer diameter of the honeycomb body 100 at the center C (shown in FIG. 6B) of the width dimension IW of the first inspection region 122 (i.e., +/−5 mm).

Light source assembly 220 is configured to emit light and to direct the light onto the outer circumferential surface 116 of the honeycomb body 100. The emitted light forms an illumination area on the outer circumferential surface 116 that encompasses the first inspection region 122 so that the first inspection region 122 is illuminated during image capture by camera 216A. Light source assembly 220 comprises at least one light source that defines an illumination axis substantially parallel with optical axis OP1 of camera 216A. In some examples, light source assembly 220 comprises a plurality of light sources. In some examples, the light sources can be high intensity monochromatic LED light sources, such as a light source constructed from an array of LED light sources. The light emitted by the light sources is defined by at least one wavelength, and in some examples the wavelength is be selected to match the material of the honeycomb body 100 to provide desired image quality. In embodiments, the light source assembly 220 is configured to emit white light, and in embodiments the light source assembly 220 is configured to emit red light. Each light source can also comprise a lens that can provide a very highly focused and narrow illumination area, such as line-illumination of a portion of the honeycomb body 100. In embodiments, each light source is configured to provide an illumination area having a length of at least 200 mm.

In the exemplary embodiments illustrated in FIGS. 4 and 7-10, light source assembly 220 comprises a pair of light sources, each defining an illumination axis. In embodiments that comprise a plurality of light sources, each of the light sources can be a focused high intensity light source configured to form an illumination area on the outer circumferential surface 116 that encompasses the first inspection region 122, so that the illumination areas of the plurality of light sources overlap. In embodiments, each light source is oriented to define an illumination angle between an illumination axis and the optical axis OP1 of camera 216A. In some embodiments, the illumination angle is as close as possible to 0° so the visibility of some surface anomalies, such as corrugation, is reduced. In embodiments, the illumination angle is less than or equal to 15°, less than or equal to 12°, or even less than or equal to 10°. In embodiments, a pair of light sources is included, and the light sources are disposed on opposite sides of the optical axis OP1 of the camera 216A. In some examples, the light source assembly 220 is configured to emit high intensity light, such as having a total intensity of at least one million lux, or even at least two million lux. For example, a plurality of light sources can be included having a combined intensity of two million lux. As will be discussed below, inspection apparatus 200 utilizes the light generated by light source assembly 220 along with the at least one camera 216A of the camera sub-assembly 204 to collect a plurality of images and form a composite camera image 236 (shown in FIG. 11) for analysis of potential defects.

Figure 8:
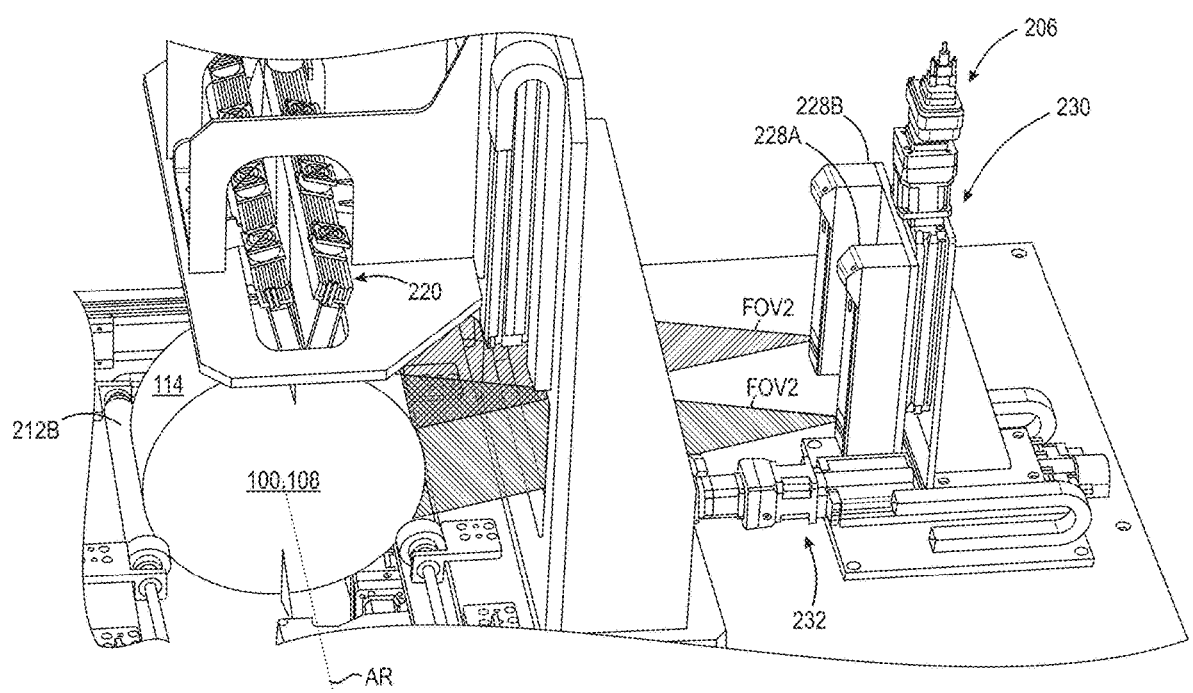
FIG. 8 is a side perspective view of an inspection system according to the present disclosure.

As illustrated in FIGS. 7-8, inspection apparatus 200 comprises a three-dimensional (3D) line sensor sub-assembly 206. The 3D line sensor sub-assembly comprises at least one 3D line sensor 228A configured to measure changes in the surface topology of skin 114 of honeycomb body 100 as it rotates about axis AR. In some examples, as illustrated in FIGS. 7 and 8, 3D line sensor sub-assembly 206 comprises a plurality of 3D line sensors, i.e., first 3D line sensor 228A and second 3D line sensor 228B (collectively referred to as "plurality of 3D line sensors 228", "3D line sensors 228" or "sensors 228"). Similarly to the plurality of cameras (216A, 216B) discussed above, in the examples which comprise a plurality of 3D line sensors 228 each line sensor is configured along a line substantially parallel with the axis of rotation AR, such that the respective fields of view of each 3D line sensor 228, i.e., second fields of view FOV2 (shown in FIGS. 4 and 8) encompass, the entire length dimension of the honeycomb body 100. In other words, by utilizing more than one 3D line sensor 228 arranged along a line parallel with the axis of rotation AR of honeycomb body 100, inspection system 200 can ensure that the second field of view FOV2 of at least one of the 3D line sensors 228, or the collective second fields of view FOV2 of all of the 3D line sensors 228 will encompass the entire length dimension of the honeycomb body 100. In some examples, each 3D line sensor 228 is a laser triangulation sensor, although it should be appreciated that 3D line sensor sub-assembly 206 can comprise any sensor capable of obtaining three-dimensional or topographical data from the surface of at least a portion of skin 114 of honeycomb body 100. In some examples, each 3D line sensor 228, has a second optical axis OP2 (shown in FIG. 5B) arranged substantially orthogonal to the first optical axis OP1 of camera 216A and substantially orthogonal to the axis of rotation AR.

As illustrated in FIG. 8, 3D line sensor sub-assembly 206 also comprises two actuators, i.e., a first 3D line sensor actuator 230 and second 3D line sensor actuator 232. First 3D line sensor actuator 230 is intended to be a linear servo or other actuator capable of generating linear movement of at least one of the 3D line sensors 228 along a plane substantially parallel to first optical axis OP1 of camera 216A and substantially orthogonal to the second optical axis OP2 of each 3D line sensor 228. In other words, with respect to the honeycomb body 100, the first 3D line sensor actuator 230 is configured to move at least one 3D line sensor 228 up and down. This upward and downward translational motion allows the second fields of view FOV2 of each 3D line sensor 228 to maintain an acceptable angle of incidence with respect to the honeycomb body 100, such that the angle of incidence is substantially 90 degrees with respect to the outer circumferential surface 116 of skin 114. Additionally, second 3D line sensor actuator 232 is intended to be a linear servo or other actuator capable of generating linear movement of at least one of the 3D line sensors 228 along a plane substantially orthogonal to the first optical axis OP1 of camera 216A, and substantially parallel with second optical axis OP2 of each 3D line sensor 228. In other words, with respect to the honeycomb body 100, the second 3D line sensor actuator 232 is configured to move at least one 3D line sensor 228 toward and away from honeycomb body 100, e.g., along second transitional axis TA2 (shown in FIG. 5B). This translational movement is used to maintain the working distance between the 3D line sensors 228 and skin 114 of honeycomb body 100. As will be discussed below, a height map or height maps are generated by the 3D line sensor sub-assembly 206 are used to give real depth measurements of defects on the surface of skin 114 to aid in evaluation. The height map is comprised of a plurality of height data snap-shots 238 and is used to process slower trends that are not noticeable from the images captured by the cameras of camera sub-assembly 204. For example, the images captured by plurality of cameras 216 are taken at a substantially orthogonal angle to the outer circumferential surface 116 of skin 114 and therefore are not ideal to capture defects like blisters or other defects which result in localized thick or thin skin 114. Instead, the height map can be used to determine changes in localized thickness of skin 114 as an additional source of defect information.

Figure 9A:
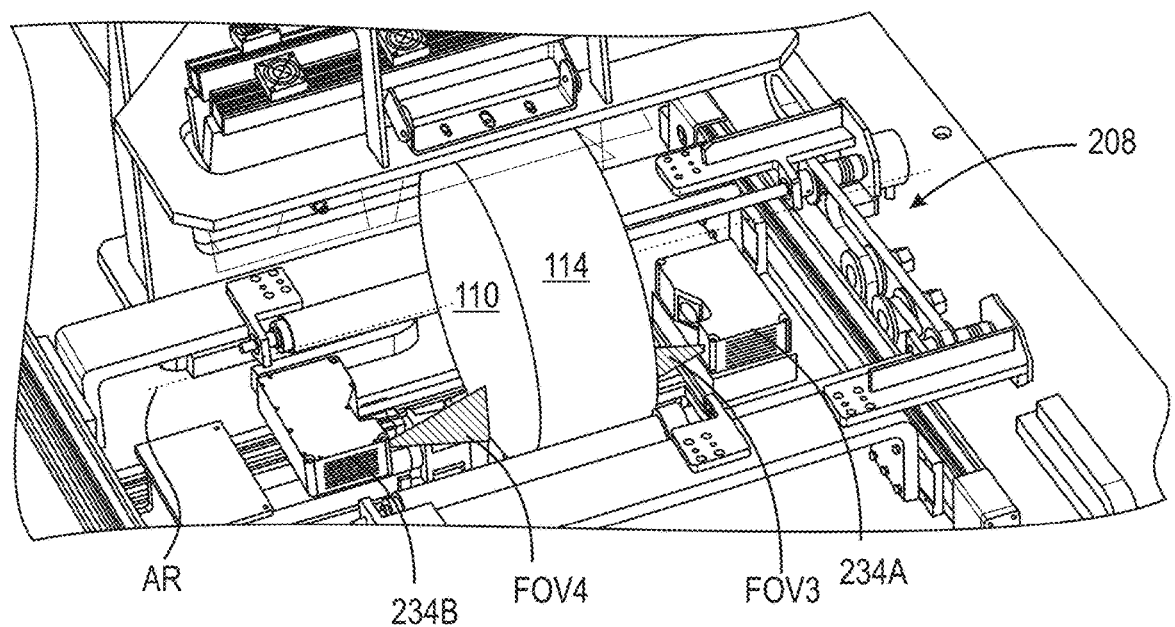
FIG. 9A is a top perspective view of a rotational sub-assembly and an edge sensor sub-assembly according to the present disclosure.
Figure 9B:
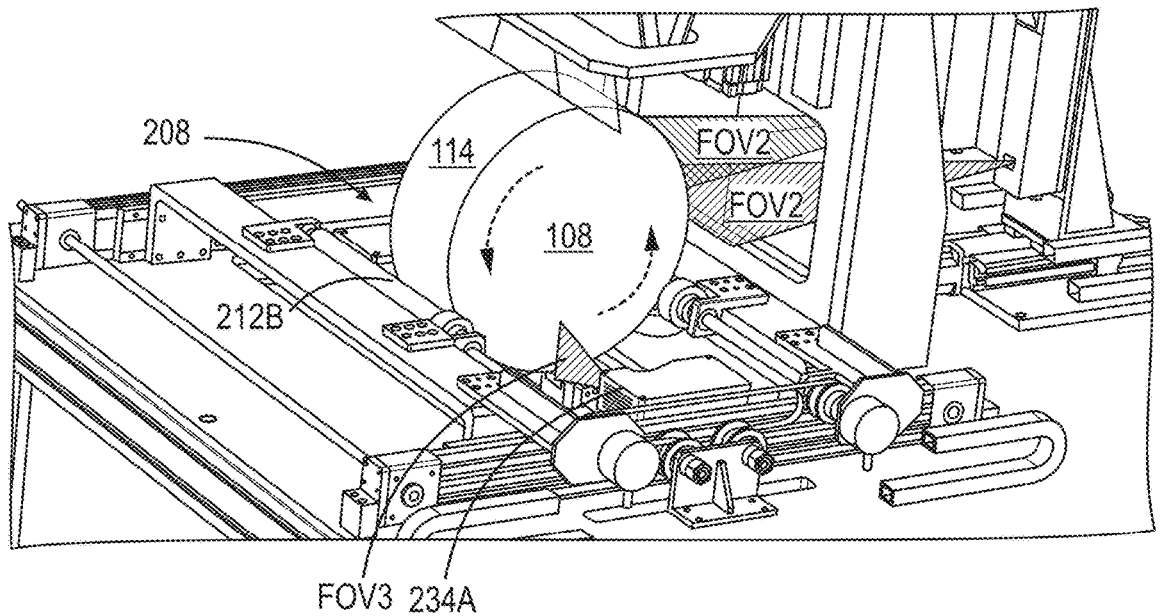
FIG. 9B is a side perspective view of a rotational sub-assembly and an edge sensor sub-assembly according to the present disclosure.
Figure 10:
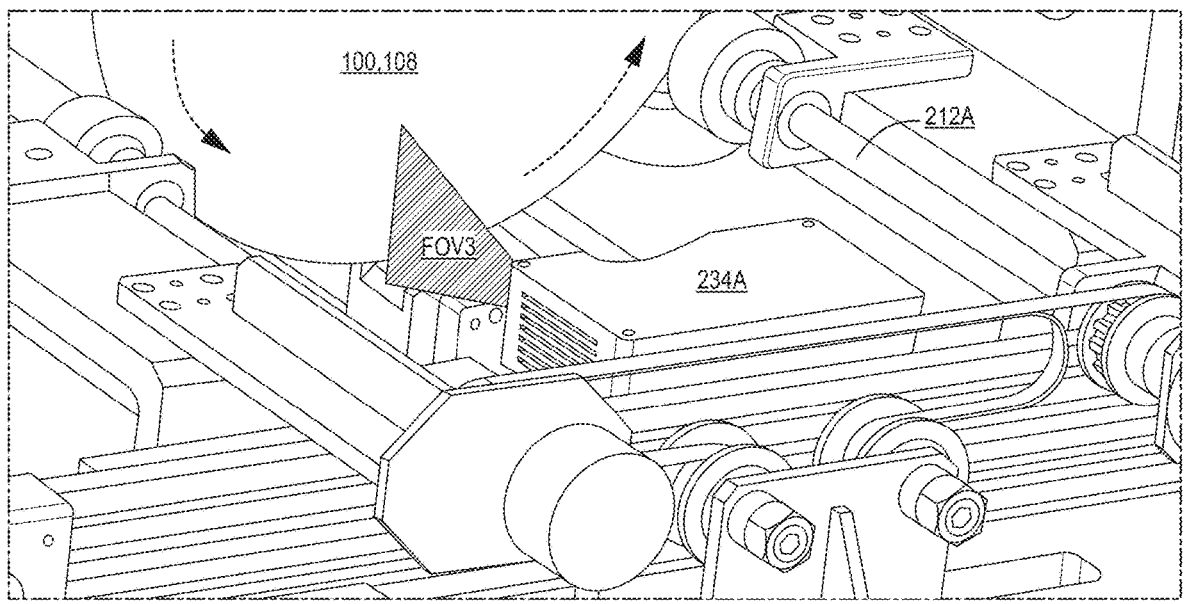
FIG. 10 is a FIG. 9A is a top perspective view of an edge sensor sub-assembly according to the present disclosure.
Figure 14A:
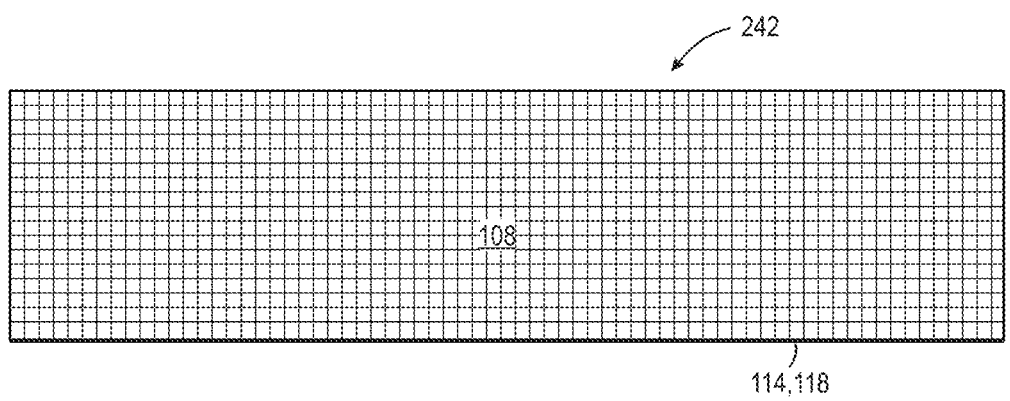
FIG. 14A is a first edge composite image according to the present disclosure.

As illustrated in FIGS. 9A-10, inspection system 200 also comprises an edge sensor sub-assembly 208. Edge sensor sub-assembly 208 comprises at least one edge sensor 234A configured to image or measure changes in first side face 108 or changes in the surface topology of first side face 108 of honeycomb body 100 proximate first circumferential edge 118. In some examples, as illustrated, edge sensor sub-assembly 208 comprises a plurality of edge sensors, e.g., first edge sensor 234A and a second edge sensor 234B (collectively referred to herein as "plurality of edge sensors 234", "edge sensors 234", or "sensors 234"). In some examples, each edge sensor 234 is a laser triangulation sensor. In other examples, each edge sensor 234 is a camera or line scan camera. As illustrated in FIG. 10, first edge sensor 234A is fixedly secured within inspection system 200 and arranged proximate the lower half of first side face 108 of honeycomb body 100. In this arrangement, the field of view of first edge sensor 234A, i.e., third field of view FOV3, encompasses at least a portion of first side face 108 of honeycomb body 100 and all of first circumferential edge 118. In this way, first edge sensor 234A is configured to collect edge data, e.g., images or topographical data, along the entire first circumferential edge 118, in a plurality of images or topographical snap-shots, and can stitch each image together to form a larger composite image, e.g., first edge composite image 242 (shown in FIG. 14A). This first edge composite image 242 can be processed and analyzed to detect one or more defects along first circumferential edge 118 as well as any defects on first side face 108 of honeycomb body 100. Second edge sensor 234B is slidingly secured within inspection system 200 and arranged proximate the lower half of second side face 110 (shown in FIG. 4) of honeycomb body 100. In this arrangement, the field of view of second edge sensor 234B, i.e., fourth field of view FOV4, encompasses at least a portion of second side face 110 of honeycomb body 100 and all of second circumferential edge 120. In this way, second edge sensor 234B is configured to collect edge data, e.g., images or topographical data, along the entire second circumferential edge 120, in a plurality of images or topographical snap-shots, and can stitch each image together to form a larger composite image, e.g., second edge composite image 244 (shown in FIG. 14B). This second edge composite image 244 can be processed and analyzed to detect one or more defects along second circumferential edge 120 as well as any defects on second side face 110 of honeycomb body 100.

Importantly, in some examples, second edge sensor 234B is configured to slidingly translate with respect to honeycomb body 100. For example, although first edge sensor 234A remains fixed with respect to honeycomb body 100, once honeycomb body 100 has been placed between rollers 212 (either manually or automatically), second edge sensor 234B can be translated to a fixed position and distance relative to second side face 110 of honeycomb body 100. In this way, edge sensor sub-assembly 208 is dynamically adaptable to inspect the edges of honeycomb bodies 100 of any desired length. For example, should a longer or shorter honeycomb body 100 be placed into inspection system 100 for inspection, the first side face 108 can be placed at a relative distance with respect to first edge sensor 234A (which is fixed to the remainder of inspection system 200), while second edge sensor 234B is slidingly translated along a first translation axis TA1 (shown in FIG. 5A) to a fixed position and distance relative to second side face 110 of honeycomb body 100.

Figure 11:
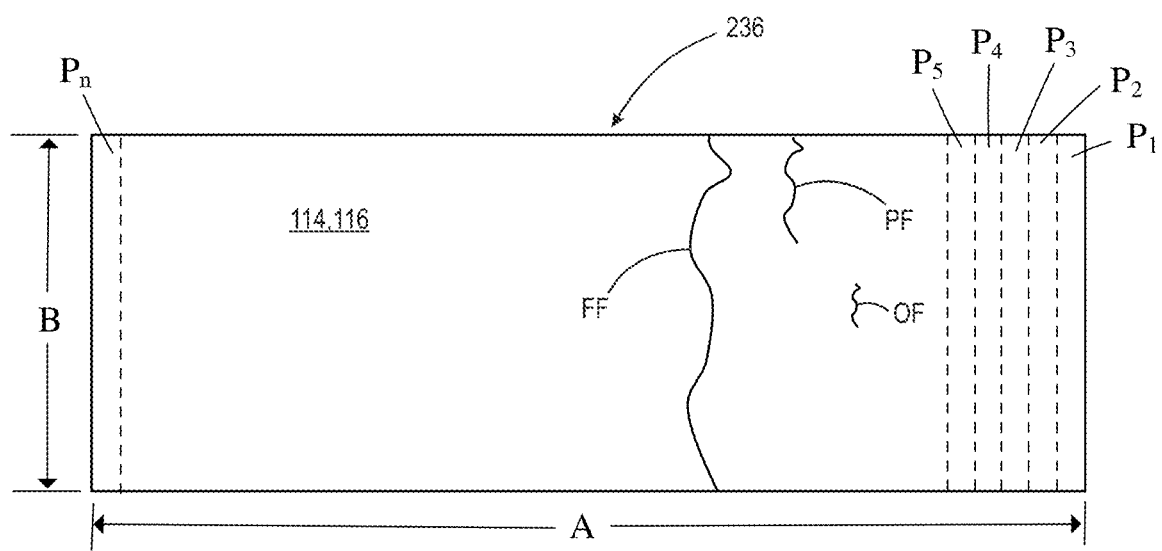
FIG. 11 is a side schematic view of a composite camera image according to the present disclosure.

Inspection system 200 further comprises a control unit (not shown) which can comprise a processor and memory configured to store and execute a plurality of non-transitory computer-readable instructions to obtain or capture image data from the component devices discussed above, and analyze and detect defects on skin 114 of honeycomb body 100. As set forth above the control unit is communicably coupled to travel sensor 214, e.g., via either a wired or a wireless connection, and is arranged to receive data related to the circumferential travel of a particular honeycomb body and is also arranged to simultaneously or in predefined stages, trigger the operation or data gathering functionality of the component devices discussed above. For example, the travel sensor 214 will trigger camera(s) 216 to start obtaining images of the first inspection region 122 as rotational sub-assembly 202 causes honeycomb body 100 to rotate about rollers 212. The control unit can receive the images taken by one or more cameras 216 and is configured to, digitally or otherwise, stitch the images taken into a single composite camera image 236 (shown in FIG. 11). As shown in FIG. 11, the composite camera image 236 is formed from a plurality of images $P_1$-$P_n$ taken of the honeycomb body 100 as it is rotated based of first inspection region 122 covering sequential sections around the circumference of the honeycomb body 100 as it is rotated. If any images are taken in duplicate, e.g., more than one image taken of the same area, then the control unit will discard the duplicative images or otherwise not use them in forming the composite camera image 236 of outer circumferential surface 116. Effectively, the composite camera image 236 is formed as if the outer skin 114 were peeled from the honeycomb body 100, laid flat and imaged, as shown schematically in FIG. 11, so that the length A of the composite camera image 236 corresponds to the circumferential length of the honeycomb body 100 and the height B corresponds to the overall length of the honeycomb body 100. The final composite camera image 236 is formed by stitching together the plurality of images P in the same sequence that they were captured, so that the final composite camera image 236 accurately displays the appearance of the entire outer surface 116 comprising any defects (e.g., a fill fissure FF, a partial fissure PF, and an oil fissure OF) on the honeycomb body 100.

Figure 12:
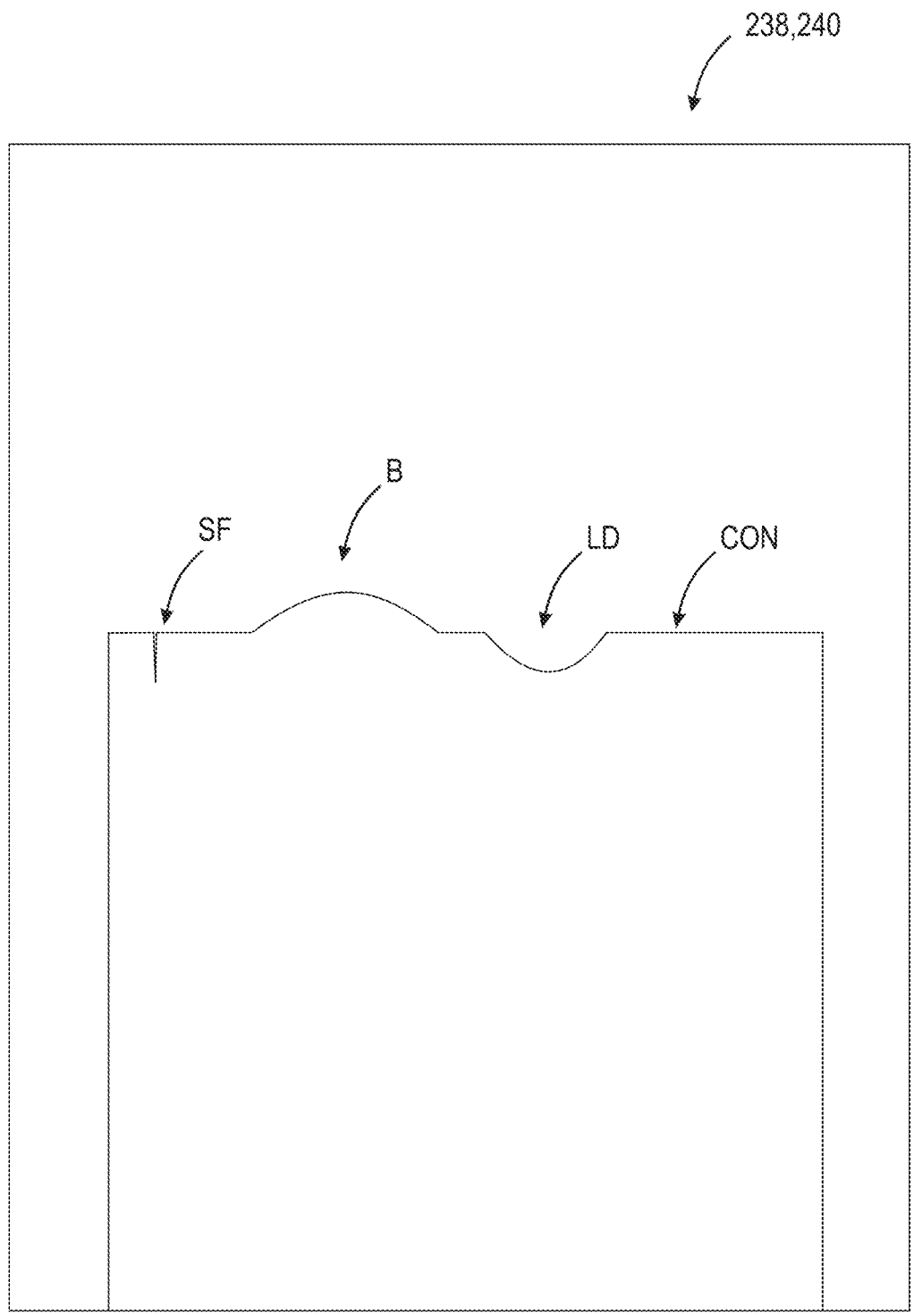
FIG. 12 is a schematic view of a height data snap-shot according to the present disclosure.

Additionally, the control unit can cause each 3D line sensor 234 of 3D line sensor sub-assembly 206 to obtain height data snap-shots 238 from the surface topology of skin 114 and ultimately to form a height map that is a compilation or 3D representation of each height data snap-shot 238 that has been stitched together to form a single unitary map of the surface topology of outer skin 114. Similarly to the images taken by cameras 216, each 3D line sensor 234 can perform a three-dimensional scan across the length of a segment of outer skin 114 of the honeycomb body 100 to take a single height data snap-shot 238. An example of a height data snap-shot 238 taken by at least one 3D line sensor 234 is illustrated in FIG. 12. As shown, defects that would otherwise elude detection through an over-head camera image, e.g., a slight fissure SF, a blister B in skin 114, a low or damaged section LD of skin 114, are easily detectable through a plurality of height data snap-shots 238 taken by at least one 3D line sensor 234. An undamaged or conforming section CON of skin 114 is also shown for reference.

Figure 13:
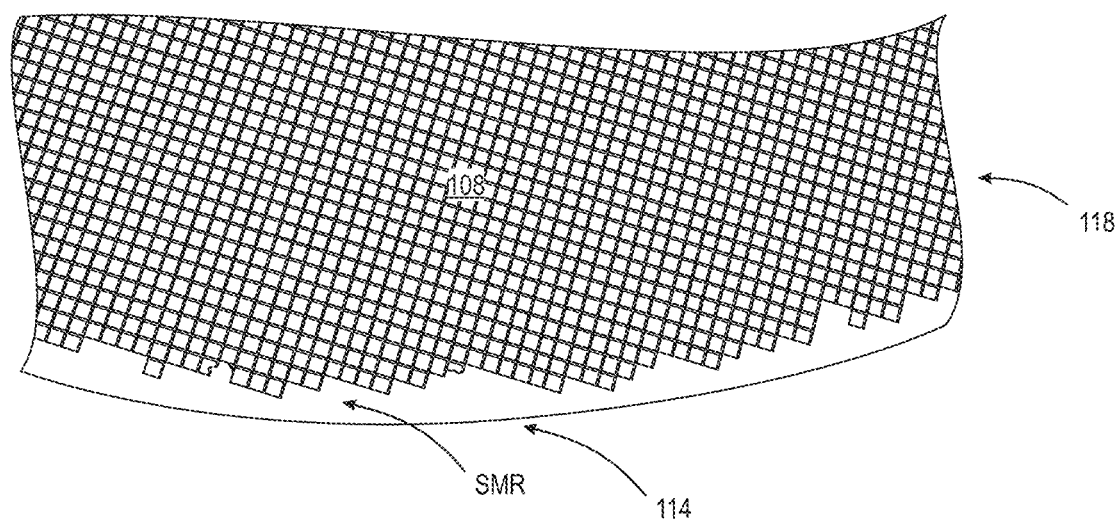
FIG. 13 is a partial view of a first circumferential edge with a cement smear according to the present disclosure.
Figure 14B:
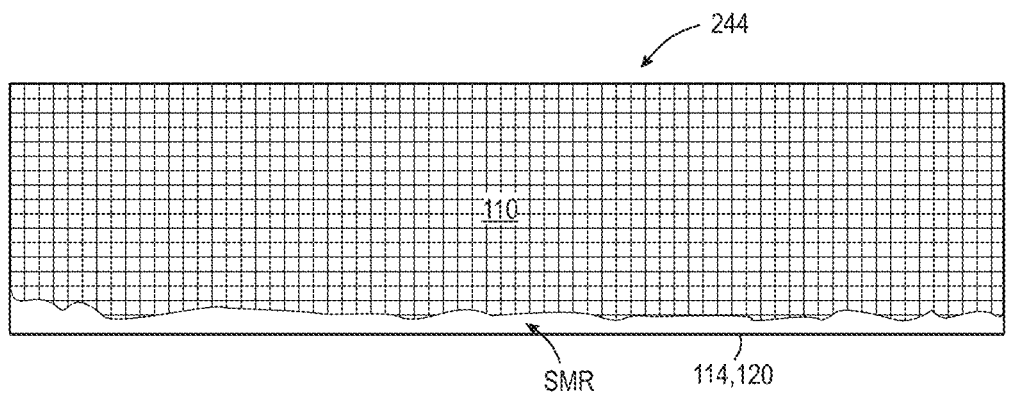
FIG. 14B is a second edge composite image according to the present disclosure.

Moreover, first edge sensor 234A and second edge sensor 234B are configured to take similar segmented images or snap-shots, i.e., obtain edge data 240, of first circumferential edge 118 and second circumferential edge 120, respectively. As illustrated in FIG. 13, in some examples, skin 114 is added after formation or extrusion of honeycomb body 100. In these examples, the skin 114 is added by adhering an outer skin 114 to the honeycomb body 100 or applying a cement to the honeycomb body 100 to form the outer skin 114. In these examples, the cement used to form the outer skin 114 can run over the outer circumferential surface and over the openings of cells 112 causing issues reducing the performance of honeycomb body 100. Edge sensor sub-assembly detects these cement smears SMR (shown in FIG. 13) and other edge related defects (e.g., protruding or recessed portions of skin 114 with respect to the respective side surface) by taking images or 3D topographical data from the side surfaces of the honeycomb body 100 up to an comprising the respective circumferential edges. For example, first edge sensor 234A is configured to capture a plurality of images of first side face 108 and first circumferential edge 118 (within third field of view FOV3) that are stitched together to form a first edge composite image 242 (shown in FIG. 14A). Similarly, in examples where first edge sensor 234A is configured as a laser line sensor, first edge sensor 234A is configured to capture snap-shots (within third field of view FOV3) of the first circumferential edge 118 and generate an edge height map of the entire first circumferential edge 118. Additionally, second edge sensor 234B is configured to capture a plurality of images of second side face 110 and second circumferential edge 120 (within fourth field of view FOV4) that are stitched together to form a second edge composite image 244 (shown in FIG. 14B). Similarly, in examples where second edge sensor 234B is configured as a laser line sensor, second edge sensor 234B is configured to capture snap-shots of the second circumferential edge 120 and generate an edge height map of the entire second circumferential edge 120. As shown in FIG. 14B.

The control unit analyzes the anomalies detected within the composite images and height data discussed above, such as by collecting measurement information and/or by classifying the anomaly into types by shape or another characteristic, to determine whether the anomalies are defects. The control unit can also be configured to count the defects and to determine whether the number of defects exceeds a predefined threshold of number of defects. In embodiments, the threshold number of defects is at most 10. In embodiments, the threshold number of defects is 5, or 3, or even 1. As an example, the determination from the control unit can be used to sort or mark a honeycomb body 100. Although not shown, in some examples the control unit is configured to trigger a rejection actuator configured to remove or extract a honeycomb body 100 from rollers 212 to reject or eject a honeycomb body 100 that includes a number of defects that exceeds the predefined threshold number of defects. In some examples, this rejection actuator is formed as a wedge shaped member beneath the honeycomb body 100 and between rollers 212 that when triggered extends upward, toward the honeycomb body 100, ejecting honeycomb body 100 from inspection system 200.

Although not illustrated the inspection apparatus 200 can also comprise a marking device configured to apply at least one indicium to a surface of the honeycomb body 100, such as by spraying ink onto the outer skin 114 of the honeycomb body 100. The marking device can be operated to indicate passing and/or failing inspection by the honeycomb body 100, such as by writing "pass," "good," "fail", or "reject" and/or by marking a symbol (e.g., check mark, X, circle, or other shape, icon, letter, color, symbol, or combinations thereof) on a surface of the honeycomb body 100. Operation of the marking device can be based at least in part on the number of identified defects determined by the control unit. For example, the honeycomb body 100 can be passed or rejected based on a threshold as described above, and the honeycomb body 100 can be marked accordingly. In an example, the honeycomb body 100 is marked as passing inspection (e.g., by applying "pass" or "good" on the outer skin 114) using the marking device if a number of identified surface defects is less than the threshold.

Additionally, and although not illustrated, in some examples inspection system 200 comprises a presence sensor to identify when a honeycomb body 100 is disposed on rollers 212 and can be used to initiate inspection of the honeycomb body 100. The presence sensor can be fixed on a portion of rotational sub-assembly 202 and can be directed to a location adjacent drive roller 212A that is occupied by a loaded honeycomb body 100. The presence sensor can be a laser presence sensor or distance sensor.

Given the foregoing, in some examples, a defect which presents itself on skin 114 is imaged by more than one component device. For example, a full fissure FF, partial fissure PF, or oil fissure OF (shown in FIGS. 2A-2B), can present themselves in the composite camera image 236 as well as the topographical height map generated by the height data snap-shots 238. Similarly, a blister, e.g., formed at the boundary of the outer skin 114 and first side face 108 will be detected by the 3D line sensors 228 in the height data snap-shots 238 as well as in the first edge composite image 242. So that these defects are not double-counted or misinterpreted by the control unit performing the defect detection and analysis, and therefore to prevent the rejection of a given honeycomb body due to double counting these defects and classifying the honeycomb body 100 as exceeding the predefined threshold number of defects, a universal coordinate system is implemented such that the control unit can classify a single defect that happens to present itself in more than one set of data obtained by the component devices as a single defect. In one example, the control unit is configured to obtain all data from each component device in real-time, and after stitching images together to form a topographical height map and/or one or more composite images, can time-align or distance-align each composite image or height map to each other so that any defect that appears in one form of data collection also appears at the same time or distance in the other forms of data collection. In another example, as each data capturing component device is mounted at a fixed orientation relative to each other about axis of rotation AR, each component device can be activated or otherwise triggered after a predetermined amount of circumferential travel (measured by travel sensor 214) such that each component device begins capturing data at the same location with respect to outer skin 114 as the other component devices. For example, cameras 216 begin imaging outer skin 114 within first field of view FOV1, as rotational sub-assembly 202 continues to rotate honeycomb body 100 (e.g., clockwise as shown in FIGS. 5A and 5B) once a predetermined about of circumferential travel places that initial imaged portion within second field of view FOV2 of at least one 3D line sensor 228, the control unit can trigger the at least one 3D line sensor 228 to begin taking height data snap-shots 238. Similarly, by continuing to rotate honeycomb body 100 in the same direction, after a certain amount of additional circumferential travel, the initial imaged portion will enter into the third field of view FOV3 of first edge sensor 234A and fourth field of view FOV4 of second edge sensor 234B and the control unit can trigger each edge sensor to begin collecting image or snap-shot data. Once all image data are captured, the beginning of each set of data can be compared to each other and will all reflect the same starting point along outer circumferential surface 116. In this way, defects that present themselves across different sources of data can be counted as a single defect.

During operation, inspection system 200 is configured to collect image and other data of skin 114, first circumferential edge 118, and second circumferential edge 120, of a honeycomb body 100. After data collection, a control unit operatively coupled to inspection system 100 is configured to analyze the collected data and detect and classify the defects present on outer skin 114. If the honeycomb body 100 includes a number of defects that exceeds a predefined threshold, the honeycomb body 100 is rejected or marked for further analysis. To that end, honeycomb body 100 is formed or extruded using various techniques known to those with ordinary skill. Once formed, honeycomb body 100 is manually placed or automatically placed within rotational sub-assembly 202, e.g., between and supported by rollers 212. The control unit is configured to detect the presence of honeycomb body 100 and will trigger motor 210 to begin rotating drive roller 212A, in turn causing rotation of honeycomb body 100 about axis AR. Once the honeycomb body 100 begins to rotate, or after a predetermined amount of circumferential travel of the honeycomb body 100, the control unit can send a signal to each component device of inspection system 200, e.g., each camera 216 of camera sub-assembly 204, each 3D line sensor 228 of 3D line sensor sub-assembly 206, and each edge sensor 234 of edge sensor sub-assembly 208 to begin capturing data of outer skin 114. The control unit can them compare, analyze, and correlate the data from all component devices to determine the number and/or type of defects present on the outer skin 114 of honeycomb body 100. Importantly, the control unit can utilize a universal coordinate system to ensure that data collected by different component devices or different sub-assemblies are correlated, synchronized, or otherwise aligned so that a defect that presents itself in more than one set of data is not double counted as two defects. Should the number of defects detected after this correlation exceed the predetermined threshold, the honeycomb body can be rejected or marked for further analysis.

Figure 15:
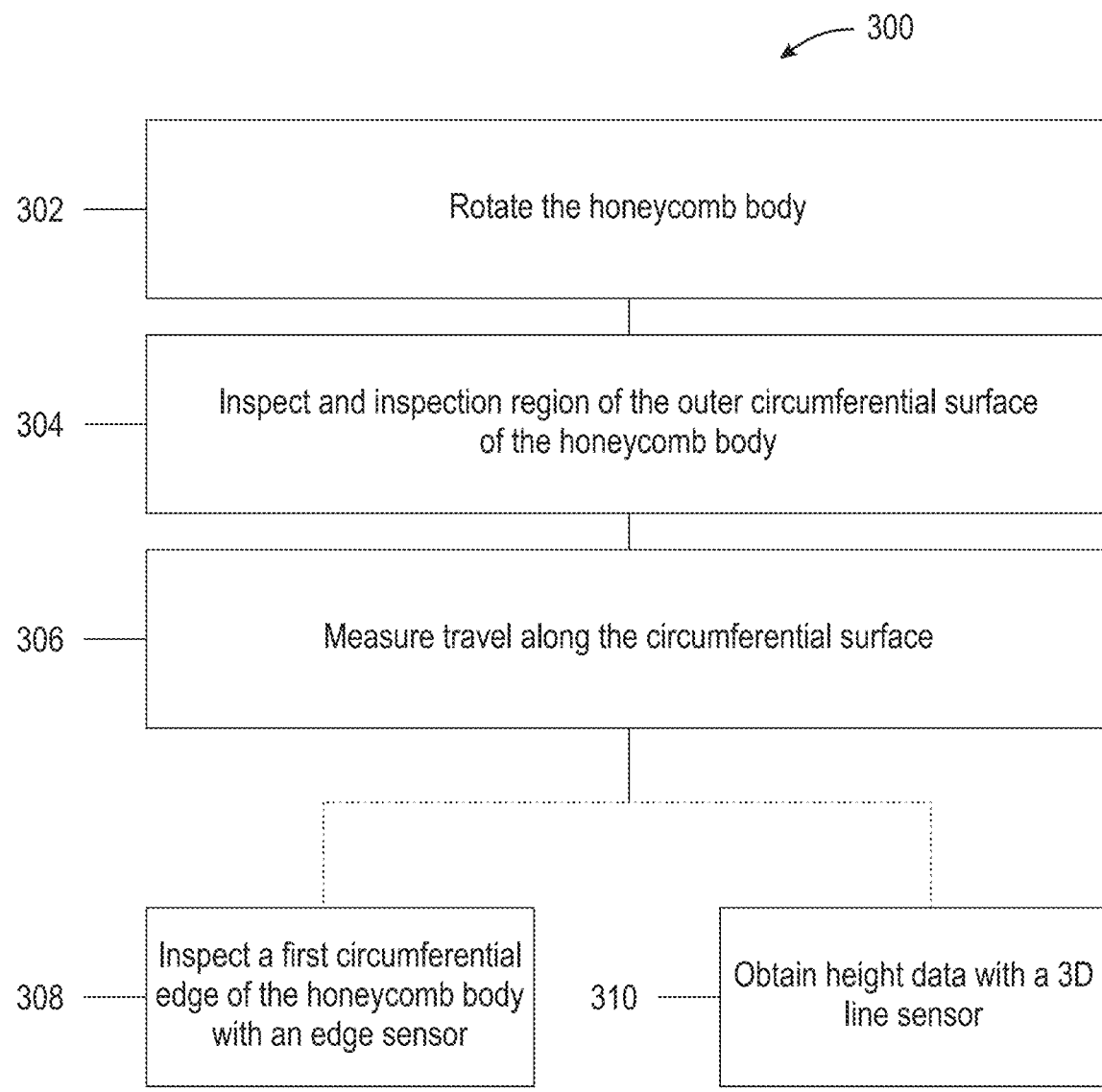
FIG. 15 illustrates the steps of a method according to the present disclosure.
Figure 16:
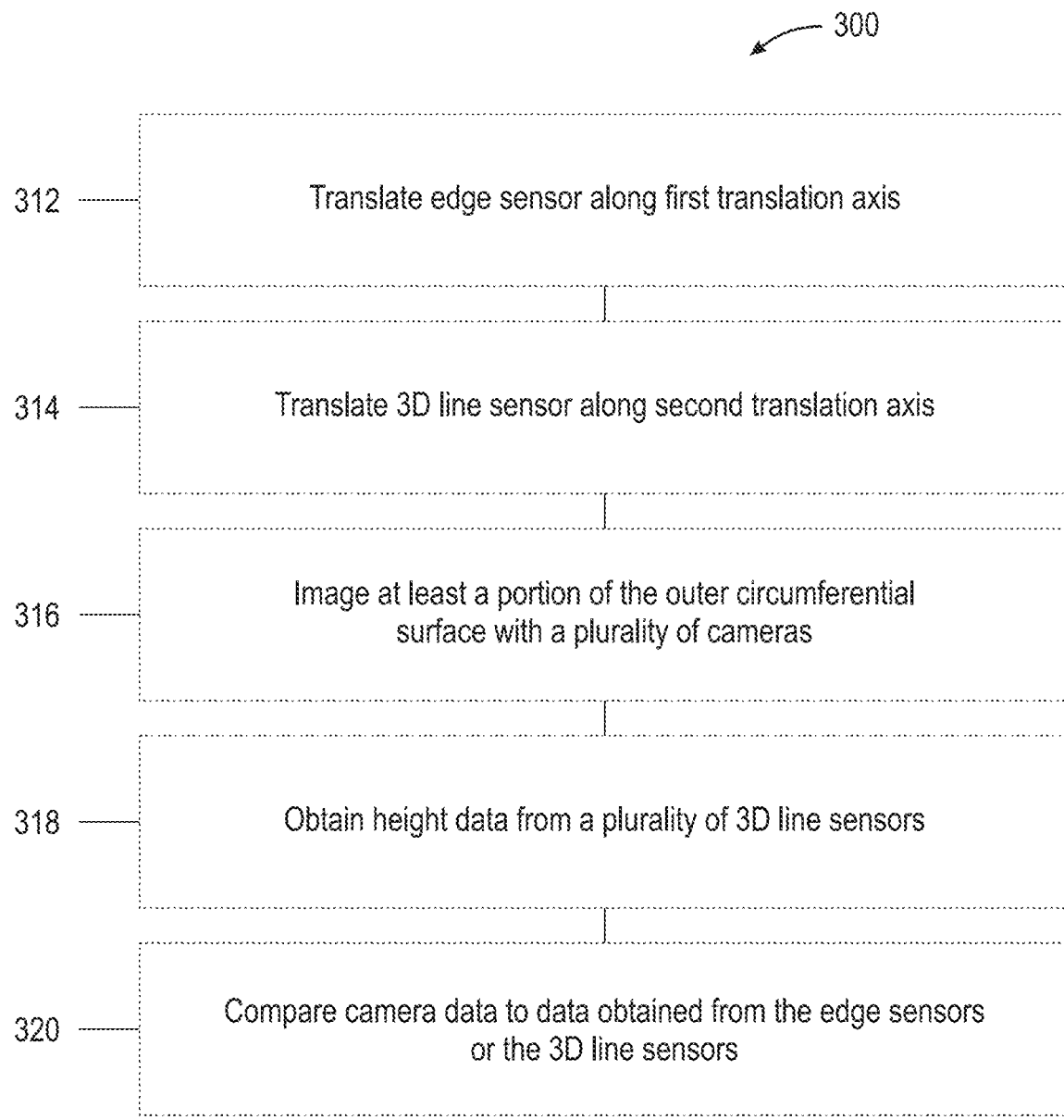
FIG. 16 illustrates the steps of a method according to the present disclosure.

FIGS. 15-16 illustrate the steps of an exemplary method 300 according to the present disclosure. For example, method 300 comprises: A method for visually inspecting and measuring a honeycomb body 100, the method comprising: rotating, via at least one roller, the honeycomb body, continuously over at least a portion of a full rotation of the honeycomb body about an axis of rotation (step 302); inspecting, via a first field of view of at least one camera, an inspection region of an outer circumferential surface of the honeycomb body (step 304); measuring, via a travel sensor, a travel along the outer circumferential surface of the honeycomb body when the honeycomb body is rotated by the at least one roller (step 306); and triggering, via the travel sensor, an inspection of a first circumferential edge of the honeycomb body via a first edge senor (step 308), or a gathering of height data associated with the outer circumferential surface of the honeycomb body via at least one 3D line sensor (step 310); wherein the triggering occurs at a predetermined increment of circumferential travel. In some examples, the method can optionally comprise translating the second edge sensor along a first translational axis, wherein the first translational axis is substantially parallel with the axis of rotation (step 312); translating the at least one 3D line sensor within a plane substantially parallel with the axis of rotation and along a second translational axis, via a line sensor actuator, wherein the second translational axis is substantially orthogonal to the axis of rotation (step 314); imaging with the at least one camera at least a portion of the outer circumferential surface of the honeycomb body, wherein the at least one camera comprises a plurality of cameras arranged substantially parallel with the axis of rotation (step 316); obtaining height data via the at least one 3D line sensor, wherein the at least one 3D line sensor comprises a plurality of 3D line sensors arranged substantially parallel with the axis of rotation (step 318); and/or comparing data obtained by the at least one camera with data obtained by either (i) the first edge sensor; or (ii) the at least one 3D line sensor (step 320).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also comprising more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily comprising at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "comprising," "carrying," "having," "containing," "involving," "holding," "composed of," and the like are to be understood to be open-ended, i.e., to mean comprising but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, comprising an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, comprising a local area network (LAN) or a wide area network (WAN), or the connection can be made to an external computer (for example, through the Internet using an Internet Service Provider). In some examples, electronic circuitry comprising, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system for visual inspection and three-dimensional (3D) measurement of a honeycomb body, the system comprising:
    at least one roller supporting the honeycomb body, the roller configured to enable the honeycomb body to rotate continuously over at least a portion of a full rotation of the honeycomb body about an axis of rotation;
    at least one camera having a first field of view encompassing an inspection region of an outer circumferential surface of the honeycomb body;
    a travel sensor that measures circumferential travel along the outer circumferential surface of the honeycomb body when the honeycomb body is rotated by the at least one roller; and
    a first edge sensor configured to inspect a first circumferential edge of the honeycomb body; or
    at least one 3D line sensor configured to inspect and obtain height data associated with the outer circumferential surface of the honeycomb body;
    wherein the travel sensor is configured to initiate inspection by the at least one camera and at least one of the first edge sensor or the at least one 3D line sensor at a predetermined increment of circumferential travel.

2. The system of claim 1, wherein the first edge sensor has a second field of view that encompasses at least a portion of a first end of the honeycomb body and the first circumferential edge of the honeycomb body.

3. The system of claim 1, further comprising a second edge sensor with a third field of view that encompasses at least a portion of a second end of the honeycomb body and a second circumferential edge of the honeycomb body.

4. The system of claim 3, wherein the second edge sensor is configured to translate along a first translational axis, wherein the first translational axis is substantially parallel with the axis of rotation.

5. The system of claim 1, wherein the at least one 3D line sensor is secured to a line sensor actuator, the line sensor actuator configured to translate the at least one 3D line sensor within a plane substantially parallel with the axis of rotation and along a second translational axis, wherein the second translational axis is substantially orthogonal to the axis of rotation.

6. The system of claim 1, wherein a first optical axis associated with the first field of view of the at least one camera, is arranged substantially orthogonal to a second optical axis associated with the at least one 3D line sensor.

7. The system of claim 1, wherein the at least one camera comprises a plurality of cameras arranged substantially parallel with the axis of rotation.

8. The system of claim 1, wherein the at least one 3D line sensor comprises a plurality of 3D line sensors arranged substantially parallel with the axis of rotation.

9. The system of claim 1, wherein, data obtained by the at least one camera is compared to data obtained by either (i) the first edge sensor; or (ii) the at least one 3D line sensor.

10. The system of claim 9, wherein, when the system comprises the first edge sensor, the comparison of data comprises synchronizing or aligning at least one composite image obtained by the at least one camera with the data obtained by the first edge sensor; or wherein, when the system comprises at least one 3D line sensor, the comparison of data comprises synchronizing or aligning the at least one composite image obtained by the at least one camera with the data obtained by the at least one 3D line sensor.

11. A method for visually inspecting and measuring a honeycomb body, the method comprising:

rotating, via at least one roller, the honeycomb body, continuously over at least a portion of a full rotation of the honeycomb body about an axis of rotation;

inspecting, via a first field of view of at least one camera, an inspection region of an outer circumferential surface of the honeycomb body;

measuring, via a travel sensor, a travel along the outer circumferential surface of the honeycomb body when the honeycomb body is rotated by the at least one roller; and triggering, via the travel sensor, an inspection of a first circumferential edge of the honeycomb body via a first edge senor, or a gathering of height data associated with the outer circumferential surface of the honeycomb body via at least one 3D line sensor; wherein the triggering occurs at a predetermined increment of circumferential travel.

12. The method of claim 11, wherein the inspection of the first circumferential edge of the honeycomb body via the first edge sensor comprises inspecting, in a second field of view, at least a portion of a first end of the honeycomb body and the first circumferential edge.

13. The method of claim 11, further comprising inspecting, via a second edge sensor with a third field of view, at least a portion of a second end of the honeycomb body and a second circumferential edge of the honeycomb body.

14. The method of claim 13, further comprising: translating the second edge sensor along a first translational axis, wherein the first translational axis is substantially parallel with the axis of rotation.

15. The method of claim 11, further comprising: translating the at least one 3D line sensor within a plane substantially parallel with the axis of rotation and along a second translational axis, via a line sensor actuator, wherein the second translational axis is substantially orthogonal to the axis of rotation.

16. The method of claim 11, wherein a first optical axis associated with the first field of view of the at least one camera, is arranged substantially orthogonal to a second optical axis associated with the at least one 3D line sensor.

17. The method of claim 11, further comprising: imaging with the at least one camera at least a portion of the outer circumferential surface of the honeycomb body, wherein the at least one camera comprises a plurality of cameras arranged substantially parallel with the axis of rotation.

18. The method of claim 11, further comprising: obtaining the height data via the at least one 3D line sensor, wherein the at least one 3D line sensor comprises a plurality of 3D line sensors arranged substantially parallel with the axis of rotation.

19. The method of claim 11, further comprising: comparing data obtained by the at least one camera with data obtained by either (i) the first edge sensor; or (ii) the at least one 3D line sensor.

20. The method of claim 19, wherein the step of comparing data when the method comprises obtaining data from the first edge sensor, comprises synchronizing or aligning at least one composite image obtained by the at least one camera with the data obtained by the first edge sensor; or when the method comprises obtaining data from the at least one 3D line sensor, the comparison of data comprises synchronizing or aligning the at least one composite image obtained by the at least one camera with the data obtained by the at least one 3D line sensor.

* * * * *